R. J. HUGHES.
RESILIENT WHEEL.
APPLICATION FILED DEC. 31, 1907.
1,055,750.
Patented Mar. 11, 1913.
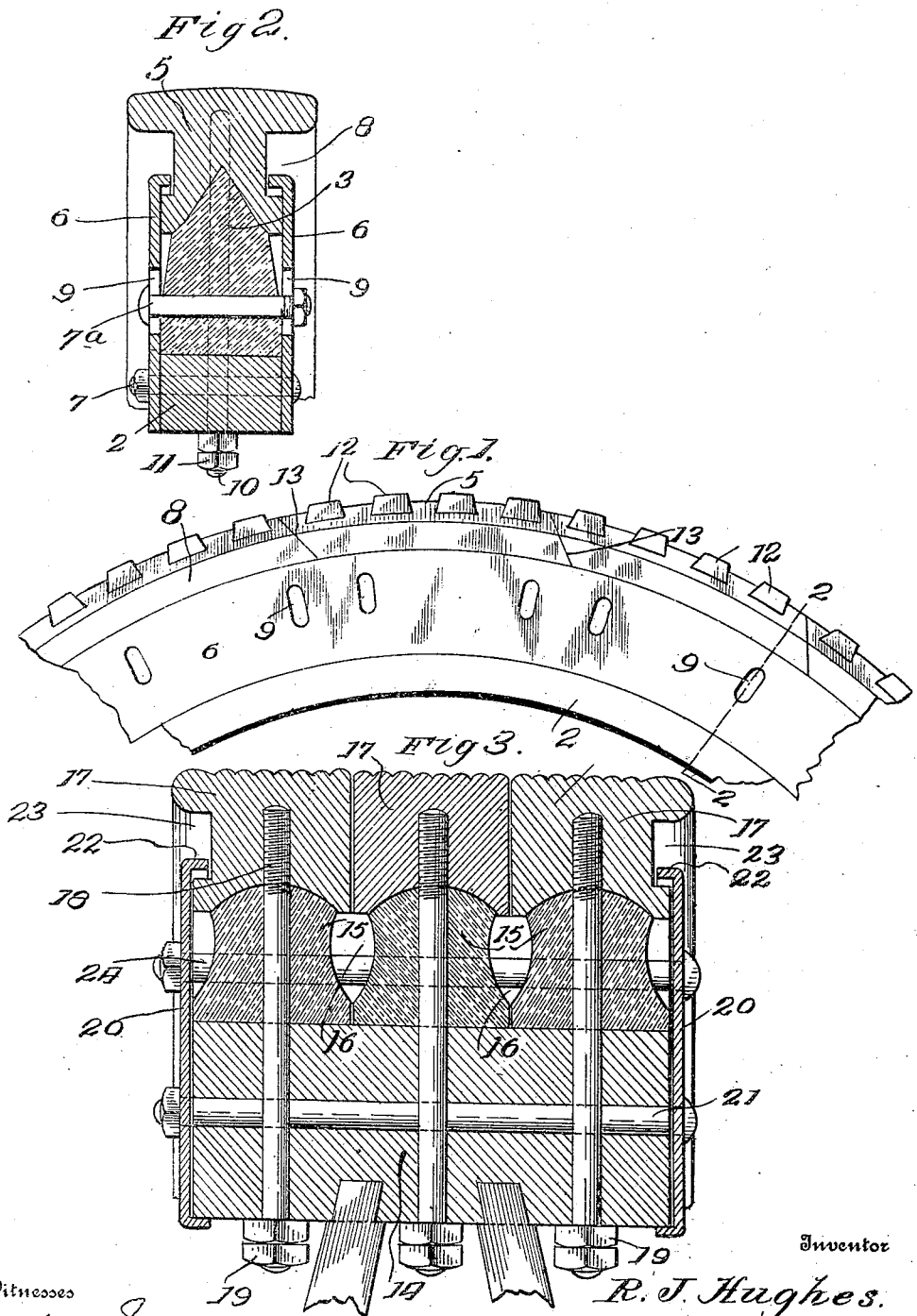
Inventor
R. J. Hughes.
Witnesses
By
Attorneys

UNITED STATES PATENT OFFICE.

ROBERT J. HUGHES, OF HOUSTON, TEXAS.

RESILIENT WHEEL.

1,055,750.   Specification of Letters Patent.   Patented Mar. 11, 1913.

Application filed December 31, 1907. Serial No. 408,716.

*To all whom it may concern:*

Be it known that I, ROBERT J. HUGHES, citizen of the United States, residing at Houston, in the county of Harris and State of Texas, have invented certain new and useful Improvements in Resilient Wheels, of which the following is a specification.

My invention relates to resilient wheels and has for its object the provision of a very simple, durable and efficient construction of resilient wheel which is designed to do away with the cushion or pneumatic tires usually employed to obtain the desired resiliency, and the invention consists in the arrangement of parts and details of construction hereinafter more fully described and set forth in the appended claims.

Two forms of my invention are illustrated in the accompanying drawings, wherein:

Figure 1 is a side elevation of a portion of the rim of a wheel with my resilient tire applied thereto. Fig. 2 is an enlarged cross section on the line 2—2 of Fig. 1. Fig. 3 is a cross sectional view of a portion of a wheel rim and showing a modified form of resilient tire applied thereto.

Corresponding and like parts are referred to in the following description and indicated in all the views of the accompanying drawings by the same reference characters.

Referring particularly to Figs. 1 and 2, 2 designates a wheel felly of any suitable character and forming a portion of a wheel. Mounted upon the felly and resting solidly thereagainst are a plurality of resilient elements formed of elastic blocks 3 preferably of rubber. These blocks fit one against the other around the tire and the outer face of each block is beveled inward and outward to the middle plane of the block. The side faces of the blocks are also slightly beveled. Resting upon the outer V-shaped faces of the blocks 3 are a plurality of tread blocks 5 of any suitable relatively hard material designed to form the outer face of the wheel. These tread blocks are formed on their inner faces with V-shaped sockets or grooves so that the tread block as shown in Fig. 2 will fit down closely upon the V-shaped or beveled outer face of the elastic block 3. As a means of holding the tread blocks 5 in proper contact with the elastic elements 3, I provide the oppositely disposed side plates 6. These side plates are bolted as at 7 to the felly and at their upper ends are provided with inturned flanges engaging in recesses 8 formed in the side faces of the tread blocks. The plates 6 are annular in form and extend entirely around the felly, while the tread blocks as previously stated are sectional. The recesses 8 are considerably deeper than the thickness of the flanged portions of the plates 6 so as to permit the tread blocks to be forced inward relative to the plates 6 and against the elasticity of the blocks 3. Bolts 7ª pass through the plates 6 and through the tread blocks, the plates 6 being radially slotted as at 9 to permit these bolts to have a radial movement relative to the plates 6 and to move with the elastic blocks 3. In order to further hold the tread blocks 5 upon the faces of the elastic blocks 3 and yet permit of free movement of the elastic blocks, I provide the radially extending bolts 10 which at their outer ends are embedded or otherwise attached to the tread blocks and which extend radially through the elastic members 3 and through the felly 2. These bolts are provided on their ends with the nuts 11. It will be noted that when the tread blocks are forced inward against the elasticity of the blocks 3, the bolts will shift inward relative to the wheel rim and relative to the tread blocks. At the same time these bolts will act to assist the plates 6 in holding the tread blocks in place. The tread blocks may either have a smooth surface or they may have teeth formed by inserts 12 as shown in Fig. 1. The tread blocks are beveled at their ends as at 13, the said ends being parallel to each other so that when the tread blocks are in position, the end of one tread block will extend beneath the overhanging end of the next adjacent block. The inclined end faces of the tread blocks are smooth and have sliding engagement with each other. By reason of these inclined ends, the depression or projection of one tire section affects all the other tire sections so that the tire has a certain amount of resilient yielding longitudinally as well as radially, while at the same time the tread sections have independent movement approximately radially.

Where a tire constructed in accordance with my invention is intended to be used on trucks or other heavy vehicles, the tire may be transversely compounded as illustrated in Fig. 3. In this figure, 14 designates the wheel rim or felly and 15 a transverse series of resilient blocks. Each of these blocks has outwardly diverging sides so that when the blocks are placed together in transverse series across the wheel rim outwardly, spaces will be left between the blocks, these spaces being designated 16. It will be seen that the bases of the blocks bear against each other but that the upper ends of the blocks are free and entirely separated from each other. The outer faces of the blocks are convex. Resting upon the outer faces of the blocks are a plurality of tire sections or tread sections 17 of relatively hard material, the inner faces of these tread sections being concavely recessed so as to fit upon and bear firmly against the resilient members 15. It will be seen that the tread sections are arranged in transverse series and that each of the tread sections in any transverse series are independent of the next adjacent tread section and that the same description applies to the resilient blocks 15, these blocks being independent with relation to the other blocks of the series. In order to hold the tread sections and resilient members in place, I provide the radially extending bolts 18 which are screwed into the tread sections, extend loosely through the resilient members 15 and through the wheel rim, being provided on their inner ends with the nuts 19, these bolts 18 passing loosely through the resilient members and loosely through the rim so as not to impede the free radial movement of the tread blocks and the elastic action of the resilient blocks. For the purpose of holding the tread blocks and resilient blocks in place and preventing any lateral displacement of these blocks, I provide the annular plates 20 which are disposed on opposite sides of the tire and which are bolted to the rim or felly 14 by transverse bolts 21 which extend entirely through the felly. The outer ends of the plates 20 are inwardly flanged as at 22 and engage in lateral recesses 23 formed in the sides of the outer tread blocks, these recesses being of such radial depth as to permit the tread blocks to have free radial movement independent of the side plates 20. In order to hold the outer margins of the side plates from movement, I provide the transversely extending bolts 24 which pass through the elastic members 15. The side plates are radially slotted to permit these bolts 24 to have radial movement. The radially slotted side plates used in this construction are the same as those heretofore described with reference to Figs. 1 and 2.

It is seen that in the form of tire last described, there are a plurality of series of cushioning blocks 15, these blocks being spaced from each other at their upper portions to permit compression of the blocks. By providing the converging sides to the blocks, a space is left between the upper portions of the blocks 15 while the bases of the blocks are in contact with each other, this preventing any side movement of the blocks while permitting the blocks to be compressed. It may be noted here that the contacting faces of the tread blocks and resilient members are transversely recessed so that the members fit upon each other. This tends to prevent transverse shifting of the tread blocks relative to the resilient members, thus loosening the lateral strain on the side plates. The transverse thrust upon the outer segmental tire will be transmitted to the intermediate resilient member and is thus resisted and the strain thus to a considerable extent taken away from the side plates. Furthermore, the combination of the side plates, the radial bolts and the transverse bolts acts to bind all these parts together so that transverse strain is counteracted. It may be further noted that in the construction shown in Fig. 3, the provision of a transverse series of tread blocks and a transverse series of resilient members gives far greater cushioning effect to the wheel than would be the case did the tread blocks and resilient members extend entirely across the face of the wheel. Furthermore, it permits the parts being more readily replaced in case the tread blocks are worn or the resilient members in any way damaged.

Having thus described the invention, what is claimed as new is:

1. In a resilient wheel, the combination of a rim, a plurality of resilient members supported on the rim, a plurality of tire sections supported on the resilient members, a radial bolt extending inwardly from each of the tire sections and rigidly attached thereto, said bolts passing freely through the resilient members and through the rim and being provided on their inside ends with nuts, annular side plates mounted on the rim and extending outward beyond the resilient members, the outer margins of the side plates being provided with inwardly extending portions having sliding engagement with the tire sections, said side plates being provided with radially elongated bolt openings, and transverse bolts passing through the resilient members and through said bolt openings and holding the resilient members in engagement with the side plates.

2. In a wheel, the combination of a rim, a plurality of resilient blocks supported in transverse series on the rim, said blocks each having a rounded outer face, a plurality of series of tire sections supported on the blocks, each series composed of a plurality of segmental sections, each section having parallel inclined ends adapted to have sliding engagement with the inclined ends of contiguous sections, a radial bolt extending inwardly from each of the segmental sections and passing through the resilient blocks and through the rim and there provided with a nut. said bolts having sliding engagement with the resilient blocks and rim, plates mounted on the sides of the rim, having inwardly turned flanges slidingly engaging with the outer tire sections, transverse bolts holding said plates in engagement with the rim, and transverse bolts passing through the resilient blocks and engaging said plates.

In testimony whereof I affix my signature in presence of two witnesses.

ROBERT J. HUGHES. [L. S.]

Witnesses:
FRANK THOMAS,
CHAS. L. MICHAEL.